Figure 1:
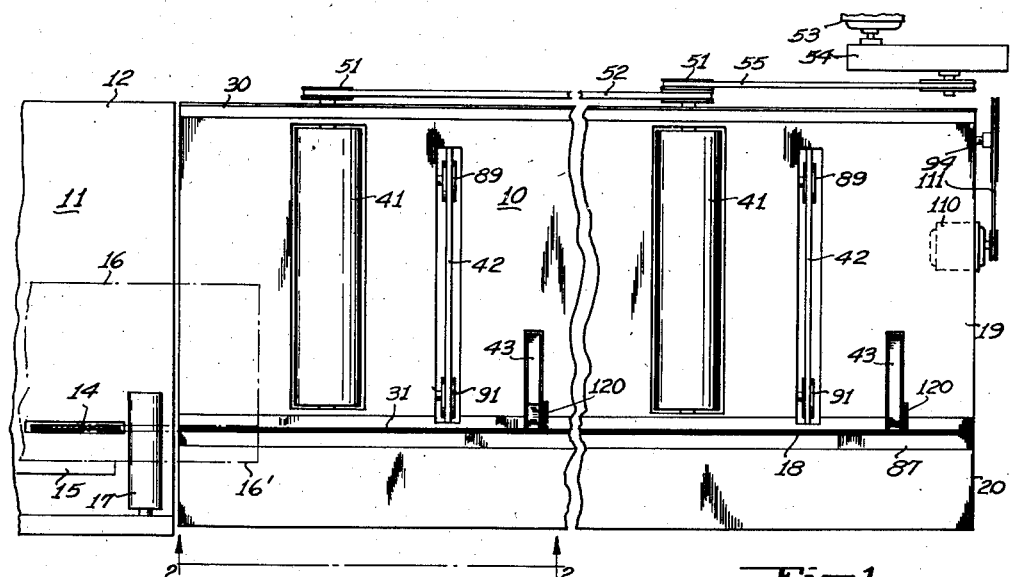

July 11, 1944.  G. A. HORSTKOTTE  2,353,239
LUMBER HANDLING TABLE
Filed Feb. 20, 1942  2 Sheets-Sheet 1

GERRY A. HORSTKOTTE
INVENTOR.

BY
ATTORNEY

July 11, 1944.	G. A. HORSTKOTTE	2,353,239
LUMBER HANDLING TABLE
Filed Feb. 20, 1942	2 Sheets-Sheet 2
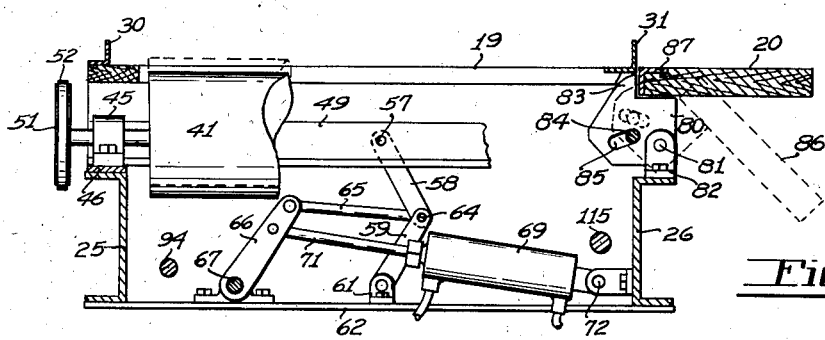
GERRY A. HORSTKOTTE
INVENTOR.
BY E. A. Buckhorn
ATTORNEY Patented July 11, 1944

2,353,239

UNITED STATES PATENT OFFICE 2,353,239

LUMBER HANDLING TABLE

Gerry A. Horstkotte, Bend, Oreg.

Application February 20, 1942, Serial No. 431,727

16 Claims. (Cl. 143—132)

The present invention relates to lumber handling tables, and more particularly to such tables as are adaptable for use in conjunction with woodworking machines such as rip saws and the like devices.

In lumber manufacturing procedures it is frequently desired to rip relatively wide boards into narrower strips of a width, for example, such as may be suitable for sash stock or for use in a molding planer. In such ripping operations it is necessary for the sawyer to pass the board through the rip saw a plurality of times. A helper is usually required at the rear of the saw to take the strip ripped from the board and deposit it on a truck or transfer it to a conveyor chain and return the board to the sawyer in front of the saw. Such handling of the lumber at the rear of the saw is an arduous, time consuming task, and hence inefficient. It is a general object of the present invention, therefore, to provide a table for use in conjunction with machines such as rip saws and which table is equipped for unloading the strips sawed from the board and for returning the remainder of the board to the sawyer at the front of the machine for feeding it through the saw a successive time.

It is a further object of the invention to provide a new and improved table for receiving lumber from rip saws and the like machines which is capable of unloading ripped strips onto a conveyor chain arranged adjacent thereto and for simultaneously returning the board from which strips are being ripped to the front of the machine.

A still further object of the present invention is to provide a table adapted for handling lumber at the end of a power saw and which is capable of either unloading one strip therefrom and returning the second to the point of origin, or unloading both strips therefrom.

A further object of the invention is to provide a lumber handling table which may be arranged behind a gang rip saw and operated upon completion of a sawing operation to unload all of the strips sidewise from the table.

Another object of the invention is to provide a new and improved lumber handling table for use with power saws and the like devices, and which table is simple in construction, reliable in operation, and of relatively low manufacturing cost.

In accordance with the illustrated embodiment of the invention, the lumber handling table comprices a support having mounted thereon an elongated top divided longitudinally into a stationary part and a movable edge part. The table is adapted to be mounted adjacent an end of a power saw or like device from which the sawed pieces of lumber are fed longitudinally upon the table, one piece being fed upon the movable edge portion of the table, while the remaining piece is fed upon the stationary table part. The strip of lumber fed onto the movable edge part of the table is unloaded therefrom by effecting a tilting of the table edge part permitting the strip to slide sidewise therefrom. The stationary table part includes means for first laterally shifting the piece of lumber fed thereupon so as to clear the saw, after which additional means are brought into operative relation with respect to the lumber piece to effect a return thereof to the point of origin where the operator of the saw may redirect the board through the saw. After the board has been passed through the saw the last time, forming two final strips, one of which has been fed onto the movable table part and the other onto the stationary table part, still other means are brought into operation for unloading both strips from the table.

Additional objects and advantages will appear from the following description taken in connection with the accompanying drawings, while the features of novelty characterizing the invention will be pointed out with greater particularity in the appended claims.

Figure 2:
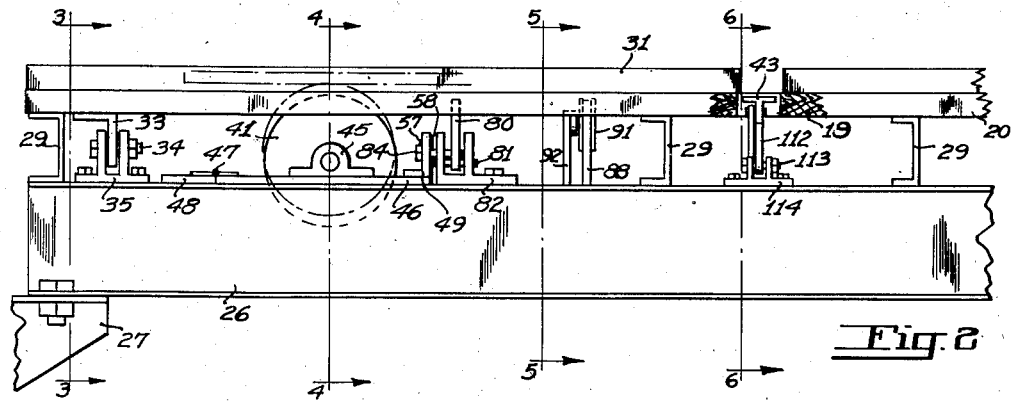

Referring to the drawings, Figure 1 is a plan view of a lumber handling table constructed in accordance with one form of the invention; Figure 2 is a side elevation of a portion of the lumber handling table shown in Figure 1; Figures 3, 4, 5 and 6 are cross sectional views through the lumber handling table, taken along the lines 3—3, 4—4, 5—5, and 6—6, respectively, of Figure 2; and Figure 7 is an enlarged sectional view taken along the line 7—7 of Figure 5.

Referring now particularly to Figure 1 of the drawings, the lumber handling table indicated generally at 10 is adapted to be arranged in an end to end relation with a woodworking machine indicated at 11. It will become apparent that the machine 11 may be of different forms but for purposes of illustration it will be described as being a power saw comprised essentially of a table 12, a circular saw 14, and an adjustable fence indicated at 15 for determining the width of the strip to be ripped from a relatively wide board indicated by dotted lines 16. The power saw may also include one or more transversely extending pressure rolls 17 for drawing the lumber through the saw and feeding the lumber therefrom longitudinally onto the handling table 10.

The power saw 11 in this particular instance is considered to be a rip saw such as may be used for ripping relatively wide boards into a plurality of relatively narrow strips by passing the board through the saw a plurality of times. The strips severed from the board may all be of the same width or they may be made of different widths by adjustment of the fence 15. By selectively adjusting the widths of strips cut from the board, a more economical utilization of the lumber may be effected. In ripping up the board, the edge strip 16' is to be unloaded from the table, while the remaining board portion is to be returned to the sawyer at the front of the power saw for redirection therethrough until the board is finally cut up. It will become obvious as the description proceeds that the power saw, instead of having merely a single blade, may be of a gang saw type. It will be understood, however, that the saw 11 forms no part of the present invention, and is merely illustrative of the general type of woodworking machine with which the lumber handling table of the invention is applicable.

The lumber handling table 10 comprises an elongated top mounted upon a suitable supporting structure in a generally horizontal position and of a height substantially flush with the table of the saw 11. The table 10 may be of any suitable length depending in general upon the length of the boards to be handled thereby, it being preferred that the length of the table be somewhat greater than the length of the boards to be fed thereupon. For convenience, only the opposite end portions of the table are shown in Figure 1, it being understood that the intermediate portions are substantially similar to those portions shown. In Figure 2, only the front end portion is shown in side elevation.

The top of the table 10 is divided longitudinally along the line indicated at 18 into two parts, the relatively wide part 19 being mounted stationarily upon the supporting structure and a relatively narrow edge part 20 being movably mounted upon the supporting structure. The dividing line 18 between the stationary and movable table top portions is so aligned with the saw disc 14 that as the lumber emerges from the saw the strip 16' severed from the wide board will be fed out upon the edge portion 20 of the table, while the remaining wide portion of the board will be fed out upon the relatively wide stationary part 19 of the table top. Means are provided for operating the movable table portion 20 upon the completion of a saw cut so that the strip portion 16' of the board is unloaded therefrom onto a suitable conveyor (not shown). Such a conveyor may consist, for example, of one or more chains extending transversely underneath the table 10 for carrying the strips to a suitable point where other operations may be performed thereupon. The conveyor chain may be arranged to run transversely beneath a plurality of handling tables similar to 10 arranged side by side so that but a single conveyor need be provided for a battery of saws. Means are also provided on the table for effecting, first, a lateral shifting movement of the wide board 16 which has been fed onto the stationary table part 19 so that it is clear of the saw 14 and rollers 17, after which additional means come into operation to return the board to the sawyer for redirection through the saw. When the last cut has been made through the board forming two final strips therefrom, one of which is fed onto the stationary table part 19 and the other onto the table part 20, means are then brought into operation for unloading both such strips onto the conveyor chain.

Figure 3:
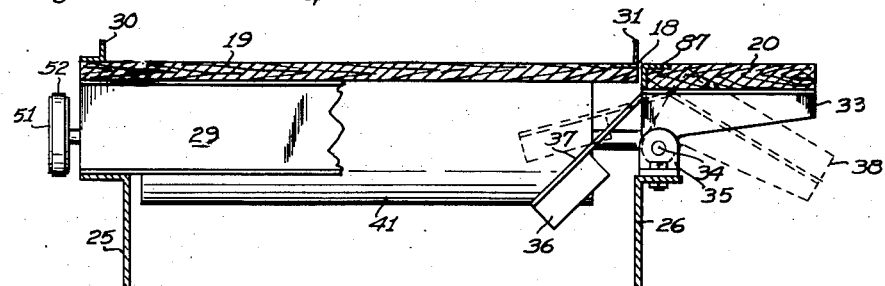

Referring now to Figures 2 and 3, the supporting structure comprises a pair of substantially parallel and spaced apart beams 25 and 26 of any suitable form, such as channel members, running the full length of the table and which are secured at the opposite ends upon suitable uprights (not shown). If desired, the forward end of the table may be supported on brackets 27 secured to the saw 12. In the particular described modification no legs are provided intermediate the opposite ends of the channel beams 25 and 26 in order that a clear space exist beneath the table for the passage of a conveyor chain designed to carry away the lumber deposited thereupon from the table. The part 19 of the table top is supported at suitable points along its length upon transversely extending channel members 29 secured at opposite ends to the longitudinal beams 25 and 26. The table top 19 is provided with longitudinal stops 30 and 31 at its opposite edges which may be formed by angle members extending the length of the table. The vertical flange of the angle 31 is adapted to be aligned with the saw blade 14 and hence will extend upwardly into the kerf of the board being sawed and fed out onto the table. The horizontal flange of the angle 31 is preferably set into a cooperating groove formed in the table top so as to lie substantially flush with the upper surface thereof.

The movable edge portion 20 of the table top is pivotally mounted adjacent the inner edge upon the longitudinal beam 26. The mounting for the table portion 20 comprises a plurality of bracket arms 33, only one being shown in Figure 2, which have a depending portion pivotally supported by pin 34 in a mounting bracket 35 which in turn may be suitably secured as by bolts to the upper surface of the beam 26. The movable table part 20 is normally biased into the horizontal position, for example, by one or more counterweights 36 mounted upon the extremities of arms 37 attached to the under side of the table part 20 and extending angularly downwardly from the inner edge thereof. In the horizontal position the inner edge of the movable table portion 20 rests against the adjacent edge of the stationary table top 19. It will be obvious that if a force is exerted against the inner edge of the movable table portion in the direction away from the stationary table 19 the table part 20 will rotate about the pivot 34 and tilt downwardly to some such position as indicated by the dotted lines 38.

The stationary table top 19 is provided with a plurality of transverse openings therethrough beneath which are mounted upon the supporting structure a plurality of each of rollers 41, lateral shifters and unloader arms, indicated generally at 42 and 43, respectively. Two groups only of such devices are shown in the representation of Figure 1 which are substantially similar in all respects. It will readily be understood that as many groups of such devices may be provided upon the stationary table as may be required, depending upon the length of the lumber intended to be handled by the table. Since these groups of operating devices are similar, only a single group and the operating means therefor will be described in detail.

The rollers 41 are mounted at the opposite ends in bearings 45 which bearings are in turn secured, as by welding, to corresponding arms 46 which in the normal inoperative position of the rollers lie flat on the top of the side beams 25 and 26, respectively. The arms 46 are hingedly connected as at 47 to blocks 48 which blocks are in turn welded to the upper surface of the side beams. The free ends of the arms 46 are rigidly connected together by means of a transversely extending angle or yoke bar 49. The roller shafts are provided at one end with pulleys 51, the various pulleys being interconnected by belts 52 and driven by a suitable motor 53 through reduction gearing 54 and drive belt 55. The rollers 41 in their lowermost position, that is, with the hinge arms 46 resting upon the upper surface of the side beams, lie somewhat beneath the surface of the stationary table part 19. Upon the exertion of an upward thrust against the transverse yoke bar 49 the hinge arms 46 will be pivoted upwardly about their respective hinges 47, raising the rollers through the corresponding openings in the table top 19. In the event that a board is lying upon the table, engagement thereof by the rotating rollers 41 will result in the board being returned to the point of origin, or, in other words, the front end of the saw. To effect such a return of the lumber the rollers 41 are driven by the motor 53 in the counterclockwise direction, as viewed in Figure 2.

Referring now to Figure 4, the operating mechanism for effecting upward movement of the rollers 41 through the cooperating openings and in a projecting relation above the surface of the table 19 will be described. Connected to the center of the yoke bar 49 as at 57 is one arm 58 of a toggle link, the other arm 59 of which is pivotally mounted by bracket 61 on the transverse member 62 secured at its opposite ends to the lower portions of the side beams 25 and 26. The central pivot 64 of the toggle 58, 59 is connected by a link 65 to one end of an arm 66, the opposite end of which arm is keyed to a rocker shaft 67 extending longitudinally of the table. The arm 66 is adapted to be operated through a predetermined arc by means of a servo-motor 69, the piston rod 71 of which is suitably connected to arm 66. The servo-motor 69 is hingedly mounted as at 72 to the adjacent side beam 26. In the collapsed condition of the toggle 58, 59 as shown, the rollers are in the lowermost position, and, as the servo-motor 69 is energized moving the arm 66 in the counterclockwise direction, the toggle 58, 59 is straightened to raise the roller 41 upwardly above the surface of the table top 19. Only one servo-motor need be provided for operating all of the various rollers, it being understood that the rocker shaft 67 extending the length of the table may be similarly connected to the yoke bars of the other rollers whereby all the various rollers may be elevated simultaneously.

Provision is made for effecting the tilting of the movable table part 20 simultaneously with the elevation of the rollers 41. Referring to Figures 2 and 4, a plate 80 is pivotally mounted by pin 81 in a bracket 82 secured to the upper surface of the side beam 26 and which plate is provided with a portion 83 defining a dog arranged for cooperatively engaging the inner edge of the table top 20. A pin 84 secured to the vertical flange of the yoke member 49 extends into an elongated slot 85 in the plate 80. The slot 85 is so arranged that upon upward movement of the pin 84 with the yoke member 49, the plate 80 will be rotated in the clockwise direction about its pivot 81. The plate dog 83, engaging with the inner edge of the table part 20, rotates it about its pivotal support to the tilted position indicated by dotted lines 86. Upon the lowering of the rollers and downward movement of the pin 84, the counterweights 36 restore the table part 20 to the horizontal position. To provide a suitable bearing edge for the dogs 83, the inner edge of the table portion 20 is equipped with a metal angle 87.

The lateral shifting devices 42, one of which is shown more clearly in the cross sectional view of Figure 5, are provided for shifting the board fed onto the stationary table top 19 laterally thereupon so that the board will be returned to the point of origin clear of the saw. Such lateral shifting of the board is effected prior to the engagement thereof by the rollers 41 which cause its return movement. The lateral shifting devices each comprise a V belt 88 trained over cooperating pulleys 89 and 91 mounted in a generally horizontally spaced relation adjacent the upper edge of a triangular frame 92 and a third pulley 93 keyed to a drive shaft 94. Referring more particularly to Figure 7, the drive shaft 94 extends longitudinally of the table and is supported at spaced intervals along its length in suitable bearings 95 attached to the adjacent side beam member 25. The bearing structure 95 includes a cylindrical hub portion 96 upon which is mounted for free pivotal movement the lower portion of the frame 92, the frame being retained upon the hub by a retainer ring 97. The side of the belt extending between the upper pulleys 89 and 91 normally lies beneath the surface of the stationary table 19 and upon upward pivotal movement of the frame 92 about the hub support 96 the belt is moved into contact with the board indicated at 101 which is carried thereby to the left, as viewed in Figure 5, its movement in this direction being limited by the angle stop 30.

Upward pivotal movement of the shifter frame 92 is effected through the rocker shaft 67 and arm 102 attached thereto, the outer end of which is connected by link 103 to the intermediate pivot 104 of a pair of toggle arms 105 and 106. The upper end of the toggle arm 105 is pivotally connected to the frame 92, while the lower end of the toggle arm 106 is pivotally connected to a bracket 107 attached to a transverse member 108 extending between the side beams 25 and 26. Rocking movement of the shaft 67 is effected by the servo-motor 69, as previously described, and which shaft is also connected for elevating the various rollers 41. In the collapsed position of the toggle arms 105 and 106 as shown, the shifter is in the lowered or inoperative position. As the shaft 67 is rotated upon the energization of the servo-motor 69 and the arm 102 rotated in the counterclockwise direction, the toggle arms 105 and 106 are straightened, raising the right end of the frame 92 and the horizontal side of the belt 88 into engagement with the board lying on the table 19. It is understood that the relation of the toggle 105, 106 to the roller elevating toggle 58, 59 is such that the shifter belt is moved into cooperative engagement with the board supported on the table top 19 before the rollers 41 are moved into engagement therewith. Therefore, the toggle 104, 105 straightens to raise the frame 92 to its maximum elevated condition in advance of the straightening of the toggle arms 58, 59 of the roller elevating mechanism. Continued rotation of the shaft 67 will cause the toggle arms 105, 106 to collapse in the opposite direction from that shown in full line, and which will effect the lowering of the shifter frame 92. In this reverse collapsed condition of the arms 105, 106, the toggle arms 58, 59 are straightened to effect elevation of the rollers 41 to their maximum position above the surface of the table 19.

By relatively slowly and continuously energizing the servo-motor to rotate the rocker shaft 61, the shifter frame 92 will first be moved upwardly into engagement with the board to effect lateral shifting thereof which operation requires only a very short interval of time, since the distance of travel in this direction required of the board is relatively slight. Further continuous movement of the shaft will then bring the rollers into the operative position and which may be left in such position for such a length of time until the board has been returned to the point of origin, when the servo-motor may be deenergized and the rollers 41 lowered and the shifter device restored to its original condition.

The belts 88 of the various lateral shifter devices 42 are adapted to be continuously driven from the shaft 94 which in turn may be driven by a suitable motor 110 (Fig. 1) connected thereto through belt 111.

When the board has been passed through the saw for the last time, ripping it into two final strips, one of which is fed onto the movable table part 20 and the other upon the stationary table part 19, both of these strips are to be unloaded onto the conveyor chain. For effecting such unloading operation of the table a plurality of unloader arms 43 are provided with operating means therefor shown more clearly in Figure 6. These unloader arms 43 each extend generally parallel with and slightly beneath the upper surface of the table 19 and have a dependent extension 112 pivotally mounted as at 113 upon bracket 114 which in turn is secured to the upper surface of the side beam 26. The various arms 43 are connected for upward movement by a rocker shaft 115 through a crank arm 116 and link 117. The rocker shaft 115 is operated by a servo-motor 118 connected thereto by a crank arm 119. The servo-motor 118 is pivotally mounted at its rear end to a bracket 121 suitably secured to the side beam member 25.

Upon energization of the servo-motor 118 the rocker shaft 115 is rotated in the clockwise direction which, through arm 116 and link 117, effects upward movement of the outer end of the arm 43 about the pivot 113. It will be observed that the inner end of the arm 43 is adapted to engage with the inner edge of the movable table portion 20 so that as the arms 43 are shifted upwardly the movable table portion 20 is simultaneously tilted downwardly. The arms 43 in moving upwardly rise above the extremity of the vertical flange of the angle 31 so that the final strip fed onto the table 19 is unloaded therefrom onto the tilted table part 20 from which it slides onto the conveyor chain therebeneath. To insure free sliding of the strips from arms 43 onto the table part 20, small arcuate pieces 120 are secured to the angle member 87, the upper edges thereof being flush with the upper edge of the angle member.

The control means (not shown) for the servo-motors 69 and 118 may be of any suitable form and are preferably arranged for manipulation by the sawyer at the forward end of the power saw 11.

Having described my invention in what is considered to be a preferred embodiment thereof, it is to be understood that the specific details shown are merely illustrative, and that the invention may be carried out by other means.

I claim:

1. A lumber handling table comprising a support, an elongated top including a longitudinal edge portion on said support, a pivotal mounting for said edge portion on said support, biasing means connected to said edge portion urging it to a horizontal position, and means adapted to be controlled by the operator for tilting said edge portion for unloading a strip of lumber fed thereupon.

2. A lumber handling table comprising a support, an elongated top on said support comprising a relatively wide stationary part and a relatively narrow movable edge part, a pivotal mounting for said edge part on said support adjacent said stationary part, biasing means secured to said edge part urging it to a horizontal position, and means adapted to be controlled by the operator for tilting said edge part downwardly for unloading a strip of lumber fed thereupon.

3. A lumber handling table comprising a support, an elongated top comprising a relatively wide stationary part and a relatively narrow movable edge portion, a pivotal mounting for said movable portion on said support adjacent the inner edge thereof, biasing means secured to said movable portion normally holding said movable portion horizontally, and operating means controlled by the operator for tilting said edge portion downwardly to unload a strip of lumber fed thereon.

4. A lumber handling table adapted for receiving a pair of lumber strips ripped lengthwise from a board and fed longitudinally thereupon, said table comprising a support, an elongated top on said support, said top being longitudinally divided into first and second parts, the line of division between said parts being aligned with the kerf between said pair of strips, means on said first table part for effecting a return of the strip fed thereupon to the original end of said table, manually controlled means for effecting operative engagement between said first mentioned means and a lumber strip on said first table part, and means responsive to operation of said first mentioned means for effecting unloading of the strip fed onto said second table part.

5. A lumber handling table adapted for receiving a pair of ripped lumber strips fed longitudinally thereupon, said table comprising a support, an elongated top on said support, said top being longitudinally divided into first and second adjacent parts, a vertical longitudinally extending strip mounted on the inner edge of said first table part aligned with and extending upwardly into the kerf between said pair of strips, means controlled by the operator for effecting the unloading of the strip fed onto said second table part, and means on said first table part responsive to actuation of said operator controlled means for effecting the return of the strip fed thereon to the front end of said table.

6. A lumber handling table comprising a support, a longitudinal top comprising an elongated stationary part and an elongated movable edge part, said edge part being pivotally mounted on said support adjacent the inner edge thereof, transverse openings in said stationary table part, means normally arranged beneath the upper surface of said stationary table part and movable upwardly through said openings for cooperatively engaging with a strip of lumber fed thereupon and returning it to the original end of said table, and means responsive to upward movement of said first named means for tilting said edge table part downwardly for unloading a strip of lumber fed thereon.

7. A lumber handling table comprising a support, an elongated top mounted on said support, said top being divided longitudinally into a stationary part and a movable part, said movable part being pivotally mounted on said support adjacent the inner edge thereof, means normally holding said movable part substantially horizontally, a transverse opening in said stationary table part, means arranged on said support and movable upwardly through said transverse opening for cooperatively engaging with a strip of lumber fed onto said stationary table part and returning it to the original end of said table, a connection between said last named means and said movable table part whereby said movable table part is tilted upon upward movement of said last named means for unloading sidewise a strip of lumber fed thereupon.

8. A lumber handling table comprising a support, an elongated top mounted on said support, said top being divided longitudinally into a stationary part and a movable edge part, said movable edge part being pivotally mounted on said support adjacent said stationary part, means normally holding said movable edge part horizontally, means for tilting said movable edge part to unload sidewise therefrom a strip of lumber fed thereupon, a transverse opening in said stationary table part, an arm pivoted beneath said top on said support in alignment with said opening and adjacent said movable edge table part, means for pivoting said arm upwardly through said opening for engaging a strip of lumber fed on said stationary table part and discharging it sidewise therefrom, and means responsive to upward pivotal movement of said arm for effecting tilting of said movable edge part.

9. A lumber handling table adapted to be mounted in an end to end relation with a rip saw, said table comprising a support and an elongated top on said support for receiving lumber fed thereupon from said saw, said top being longitudinally divided into first and second parts, the line of division between said parts being aligned with the blade of said saw, means on said first table part for effecting a return of the strip fed thereupon to the original end of said table, means for tilting said second table part to effect the unloading of a lumber strip fed thereupon, unloader means associated with said first table part for effecting the unloading of strips fed onto both said first and second table parts, said unloader means including means for actuating said tilting means.

10. A lumber handling table adapted for receiving two or more ripped lumber strips fed longitudinally thereon, said table comprising a support, an elongated top on said support, said top being longitudinally divided into first and second parts, the line of division between said parts being aligned with the kerf between an adjacent pair of said strips, means on said first table part for effecting a return of the strip fed thereupon to the original end of said table, means for operating said second table part to effect the unloading thereof, and unloading means associated with said first table part for effecting the unloading of the strip fed onto said first table part, said unloading means being so arranged as to engage said second table part upon actuation thereof so as to effect operation and unloading of said second table part simultaneously with the unloading of said first table part.

11. A lumber handling table comprising a support, an elongated top mounted on said support, said top being longitudinally divided into a stationary part and a movable edge part, said movable edge part being pivotally mounted on said support along the inner edge thereof, means normally holding said movable edge part horizontally, means for engaging said movable edge part and tilting it for unloading sidewise a lumber strip fed thereon, a transverse opening in said stationary table part, an arm pivotally mounted on said support adjacent said edge table part and in alignment with said opening, means connected to said arm for moving said arm pivotally upwardly through said opening for engaging with a lumber strip fed upon said stationary table part and discharging said lumber strip sidewise of said table, a portion of said arm operatively engaging said movable edge table part to cause tilting movement thereof upon upward pivotal movement of said arm.

12. A lumber handling table comprising a support, an elongated top mounted on said support, said top being divided longitudinally into a stationary part and a movable edge part, said movable edge part being pivotally mounted on said support adjacent the inner edge thereof, means normally holding said movable edge table part horizontally, means for tilting said movable edge table part for unloading a strip of lumber fed thereupon, unloading means mounted on said support transversely of said stationary table part and normally below the upper surface thereof, means for operating said unloading means and moving said unloading means upwardly into cooperative engagement with a lumber strip fed upon said stationary table part and unloading said lumber strip from said stationary table part, and an operative connection between said unloading means and said movable table part whereby said movable table part is tilted upon upward movement of said unloading means.

13. A lumber handling table comprising a support, an elongated top mounted on said support, a plurality of openings extending transversely of said top, a first means mounted on said support and movable upwardly through one of said openings for engaging with the under surface of the strip of lumber fed thereupon and shifting said lumber strip transversely of said top, a second means mounted on said support and movable upwardly through a second of said openings for cooperatively engaging with the under surface of said lumber strip and returning it to the original end of said top, and operating means connected to both said first and said second means for successively raising and lowering first said first means and subsequently said second means upon a single operation of said operating means.

14. A lumber handling table comprising a support, an elongated top mounted on said support for receiving a strip of lumber from a rip saw or the like device, a plurality of transversely extending openings in said top, means arranged beneath said top on said support and movable upwardly through certain of said openings for cooperatively engaging with the under surface of the lumber strip on said top and moving said lumber strip laterally of said top in one direction, means arranged beneath said top on said support and movable upwardly through certain other of said openings for cooperatively engaging with the under surface of said lumber strip and returning said lumber strip to the point of origin thereof, means arranged beneath said top and pivotally mounted on said support adjacent one edge of said top and movable upwardly through still other of said openings for engaging with the under surface of said lumber strip on said top and unloading it edgewise from said top in the direction opposite to said one direction.

15. A lumber handling table adapted for receiving a pair of lumber strips fed longitudinally thereupon, said table having a top longitudinally divided into first and second parts, said second part being hinged relative to said first part for edgewise tilting movement for effecting lateral unloading of the strip fed thereupon, means biasing said second part to a horizontal position, returning means on said first table part for effecting return movement of the strip fed thereupon, said last mentioned means being hingedly mounted on said first table part and normally extending below the upper surface thereof, means for raising said returning means above the surface of said first table part, said returning means being connected to said second table part for effecting tilting of said second table part upon raising of said returning means.

16. A lumber handling table comprising a top including a stationary part and a longitudinal edge part, hinge means supporting said edge part for outward tilting movement relative to said stationary part, means mounted on said table below said stationary part for upward movement into operative relation with respect to a lumber strip on said stationary table part and means responsive to upward movement of said last mentioned means for effecting tilting movement of said edge table part.

GERRY A. HORSTKOTTE.